United States Patent
Jung

(10) Patent No.: US 9,235,930 B2
(45) Date of Patent: Jan. 12, 2016

(54) GENERATING JUST NOTICEABLE DEPTH DIFFERENCE (JNDD) MODEL OF THREE-DIMENSIONAL (3D) DISPLAY, METHOD AND SYSTEM FOR ENHANCING DEPTH IMAGE USING JNDD MODEL

(71) Applicant: SAMSUNG ELECTRONICS CO., LTD, Suwon (KR)

(72) Inventor: Seung-Won Jung, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 254 days.

(21) Appl. No.: 13/780,629

(22) Filed: Feb. 28, 2013

(65) Prior Publication Data

US 2014/0085294 A1 Mar. 27, 2014

(30) Foreign Application Priority Data

Sep. 21, 2012 (KR) .................. 10-2012-0104968

(51) Int. Cl.
*G06T 15/00* (2011.01)
*G06T 17/00* (2006.01)
*H04N 13/04* (2006.01)
*H04N 13/00* (2006.01)

(52) U.S. Cl.
CPC ............ *G06T 17/00* (2013.01); *H04N 13/0022* (2013.01); *H04N 13/0425* (2013.01); *H04N 13/0475* (2013.01); *H04N 13/0018* (2013.01)

(58) Field of Classification Search
CPC ......... G06T 15/00; G06T 15/01; G06T 17/00; G06T 19/00
USPC ......... 345/419, 426, 589, 625, 633, 173, 420, 345/422, 582, 590, 593, 611, 626, 629
See application file for complete search history.

(56) References Cited

U.S. PATENT DOCUMENTS 8,233,739 B1 * 7/2012 Cho et al. ...................... 382/276

FOREIGN PATENT DOCUMENTS

| JP | 2012-65066 | 3/2012 |
|---|---|---|
| KR | 10-2012-0032321 | 4/2012 |
| KR | 10-2012-0044110 | 5/2012 |
| KR | 10-2012-0070132 | 6/2012 |

OTHER PUBLICATIONS

Silva, V. et al., "Sensitivity Analysis of the Human Visual System for Depth Cues in Stereoscopic 3-D Display", IEEE Transactions on Multimedia, vol. 13, No. 3, Jun. 2011, pp. 498-556.*
Jung, S. et al., "Depth Sensation Enhancement Using the Just Noticeable Depth Difference", IEEE Transactions of Image Processing, vol. 21, No. 8, Aug. 2012, pp. 3624-3637.*

* cited by examiner

*Primary Examiner* — Ke Xiao
*Assistant Examiner* — Gordon Liu
(74) *Attorney, Agent, or Firm* — Harness, Dickey & Pierce, P.L.C.

(57) ABSTRACT

A method for generating a just noticeable depth difference (JNDD) model including controlling a real size of an object to maintain a perceived size of the object for a plurality of depth testing levels, measuring a JNDD of a three-dimensional (3D) display for the plurality of depth testing levels by increasing or decreasing the real size of the object, and generating a JNDD model of the 3D display based on the measurement result.

14 Claims, 14 Drawing Sheets

GENERATING JUST NOTICEABLE DEPTH DIFFERENCE (JNDD) MODEL OF THREE-DIMENSIONAL (3D) DISPLAY, METHOD AND SYSTEM FOR ENHANCING DEPTH IMAGE USING JNDD MODEL

CROSS-REFERENCE TO RELATED APPLICATION

This application claims the priority benefit of Korean Patent Application No. 10-2012-0104968, filed on Sep. 21, 2012, in the Korean Intellectual Property Office, the disclosure of which is incorporated herein by reference.

BACKGROUND

1. Field

Example embodiments relate to generating a just noticeable depth difference (JNDD) model of a three-dimensional (3D) display, a system and method for enhancing a depth image using the JNDD model, and more particularly, to a technique of generating a JNDD model by measuring a JNDD of a 3D display, and enhancing a depth image using the JNDD model.

2. Description of the Related Art

A technique of generating a just noticeable depth difference (JNDD) model of a three-dimensional (3D) display and generating a depth image using the JNDD model may refer to a technique of generating a JNDD model by measuring a JNDD of a 3D display, and generating a depth image using the JNDD model. The JNDD herein may refer to a limit of human perception of a depth of an object.

SUMMARY

The foregoing and/or other aspects are achieved by providing a method for generating a just noticeable depth difference (JNDD) model of a three-dimensional (3D) display, the method including controlling a real size of an object to maintain a perceived size of the object for a plurality of depth testing levels, measuring a JNDD of the 3D display for the plurality of depth testing levels by increasing or decreasing the real size of the object, and generating a JNDD model of the 3D display based on the measurement result.

The controlling of the real size of the object may include adjusting the real size of the object so as to be inversely proportional to a depth of the object for the plurality of depth testing levels.

The adjusting of the real size of the object may include decreasing the real size of the object when the depth of the object increases.

The adjusting of the real size of the object may include increasing the real size of the object when the depth of the object decreases.

The measuring of the JNDD may further include adjusting an initial real size of the object, and measuring a dependency of the JNDD on the initial real size of the object.

The method for generating the JNDD model of the 3D display may further include measuring a plurality of viewing distances between the 3D display and a viewer, wherein the measuring of the JNDD includes measuring the JNDD with respect to the plurality of viewing distances.

The foregoing and/or other aspects are achieved by providing a method for enhancing a depth image of a 3D display, the method including obtaining a depth image, accessing a pre-stored JNDD model in which a perceived size of an object is maintained for a plurality of depth testing levels, and processing the depth image to maintain a perceived size of an object included in the depth image, using the JNDD model.

The processing of the depth image may include controlling a real size of the object to maintain the perceived size of the object for the plurality of depth testing levels.

The controlling of the real size of the object may include adjusting the real size of the object to be inversely proportional to a depth of the object for the plurality of depth testing levels.

The adjusting of the real size of the object may include decreasing the real size of the object when the depth of the object for the plurality of depth testing levels increases.

The method for enhancing the depth image of the 3D display may further include applying a technique of filling a hole area between the object and a surrounding area.

The adjusting of the real size of the object may include increasing the real size of the object when the depth of the object for the plurality of depth testing levels decreases.

The method for enhancing the depth image of the 3D display may further include applying at least one of a blending technique or a matting technique to match the object to the surrounding area.

The method for enhancing the depth image of the 3D display may further include to measuring a viewing distance between the 3D display and a viewer, wherein the accessing of the pre-stored JNDD model includes accessing the JNDD model corresponding to the viewing distance.

The method for enhancing the depth image of the 3D display may further include generating a 3D image using the depth image processed and a color image input.

The foregoing and/or other aspects are achieved by providing a system for generating a JNDD model of a 3D display, the system including a control unit to control a real size of an object to maintain a perceived size of the object for a plurality of depth testing levels, an measuring unit to measure a JNDD with respect to the 3D display for the plurality of depth testing levels by increasing or decreasing the real size of the object, and a generating unit to generate a JNDD model with respect to the 3D display based on the measurement result.

The foregoing and/or other aspects are achieved by providing a system for enhancing a depth image of a 3D display, the system including an obtaining unit to obtain a depth image, an accessing unit to access a pre-stored JNDD model in which a perceived size of an object is maintained for a plurality of depth testing levels, and a processing unit to process the depth image to maintain a perceived size of an object included in the depth image, using the JNDD model.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
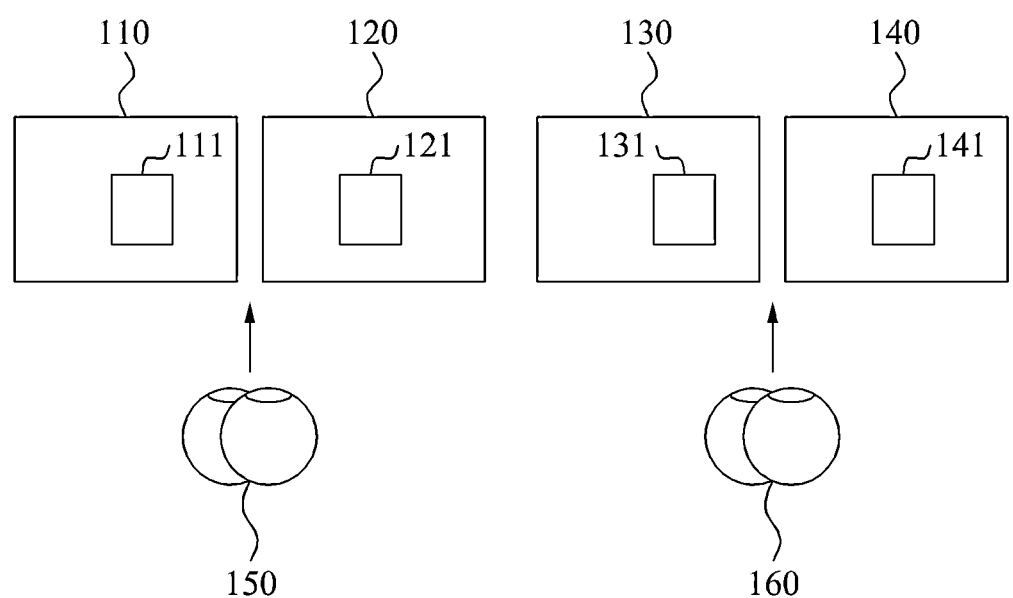
FIG. 1 illustrates a measurement of a just noticeable depth difference (JNDD) on a stereoscopic display.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a measurement of a just noticeable depth difference (JNDD) on a stereoscopic display.

Referring to FIG. 1, a first left side image 110 and a first right side image 120 displayed on left and right eyes 150, respectively, and a second left side image 130 and a second right side image 140 displayed on left and right eyes 160, respectively, may be included. The first left side image 110 and the first right side image 120 may display a first left side object 111 and a first right side object 121, and the second left side image 130 and the second right side image 140 may display a second left side object 131 and a second right side object 141. The first left side object 111, the first right side object 121, the second left side object 131, and the second right side object 141 may refer to an identical object.

The stereoscopic display may measure the JNDD by changing a depth of any one of the first left side object 111 and the first right side object 121 until a human can perceive a difference in depth, subsequent to displaying the identical objects 111 and 121 on the first left side image 110 and the first right side image 120.

For example, when the first left side object 111 in the first left side image 110 is changed to be displayed as the second left side object 131 on the second left side image 130, a human may perceive the difference in depth by a binocular disparity, and the measured JNDD may be a limit of a human perception of depth on a flat 3D display.

Figure 2:
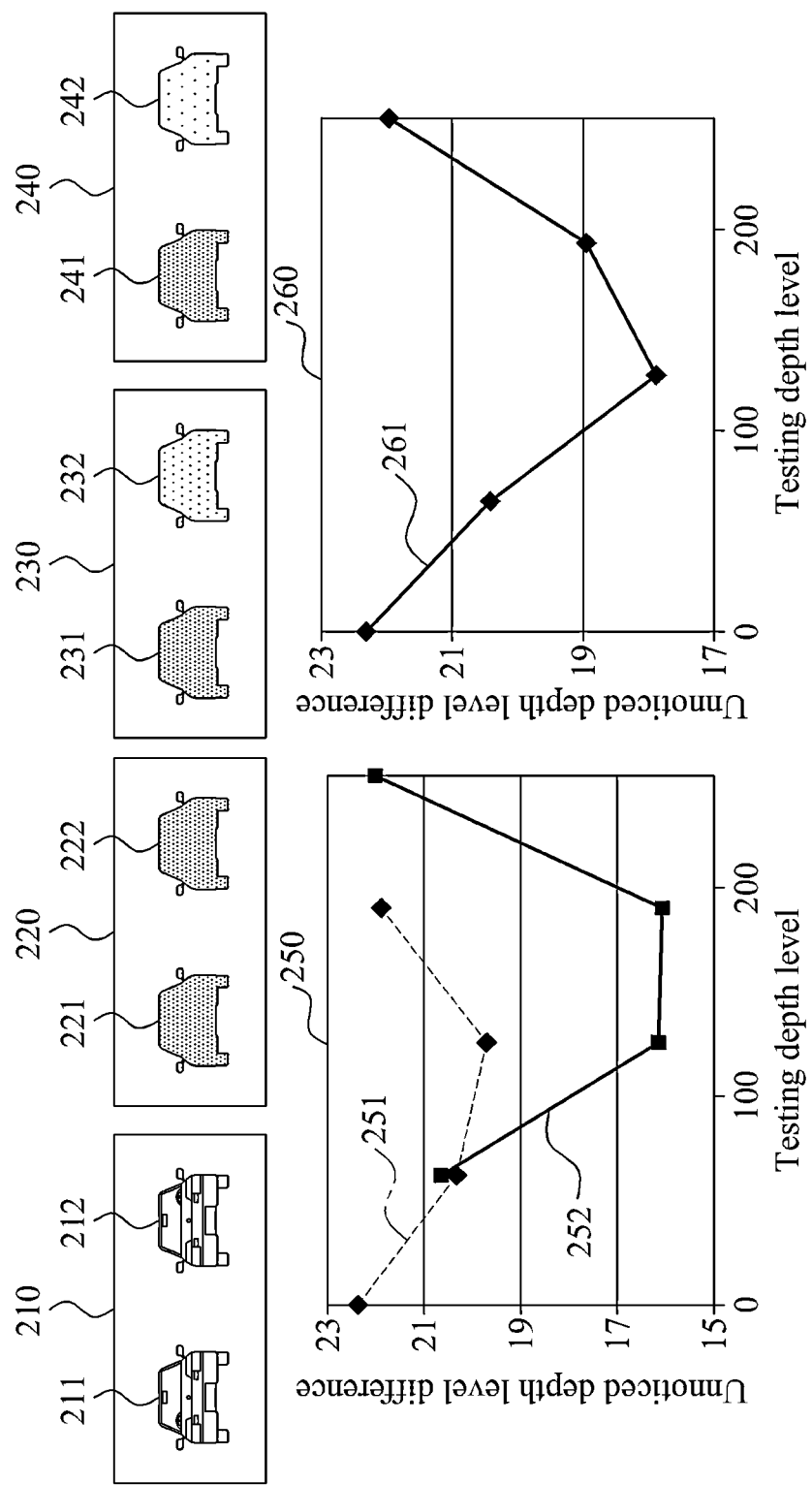
FIG. 2 illustrates a method for measuring a JNDD and the measurement result.

FIG. 2 illustrates a method for measuring a JNDD and the measurement result.

Referring to FIG. 2, a first image 210 on which two identical objects 211 and 212 are displayed to a left eye and a right eye, a first depth image 220 displaying the two identical objects 221 and 222 by a depth image corresponding to the first image 210, a second depth image 230 displaying a second object 232 which is obtained by changing a depth of the first object 222 of the first depth image 220 and an object 231 identical to the second object 232 despite having a different depth when compared to a depth of the second object 232, a third depth image 240 displaying a third object 242 which is obtained by changing a depth of the second object 232 of the second depth image 230 and an object 241 identical to the third object 242 despite having a different depth when compared to a depth of the third object 242, a first graph 250 illustrating a JNDD result based on a changing depth, and a second graph 260 may be included.

During measurement of a JNDD, subsequent to displaying the two identical objects 211 and 212 on the first image 210 for a left eye and a right eye, a depth of only the first object 222 in the first depth image 220 may be changed until a human would be able to perceive a difference in depth for a plurality of depth testing levels.

For example, when a difference between the second object 232 which is obtained by increasing a depth of the first object 222 and the object 231 displayed on the second depth image 230 may fail to be perceived, the third object 242 may be displayed on the third depth image 240 by increasing a depth of the second object 232 further, such that, a human would be able to perceive the difference in depth.

In applying such a scheme, a depth of the objects 222, 232, and 242 displayed on the depth images 220, 230, and 240 may increase, as well as decrease.

A broken line 251 of a first graph 250 illustrates a result of adjusting to decrease the depth of the objects 222, 232, and 242. A solid line 252 of the first graph 250 illustrates a result of adjusting to increase the depth of the objects 222, 232, and 242. A change of the JNDD measured by combining the broken line 251 and the solid line 252 of the first graph 250 may be illustrated as a solid line 261 of a second graph 260. When a depth testing level is about 128 zero-parallax plane (ZPP) based on a result of the measured JNDD, a JNDD value may be small. In this example, when the depth testing level is about 128, an to unnoticed depth level difference may have a highest sensitivity.

Figure 3:
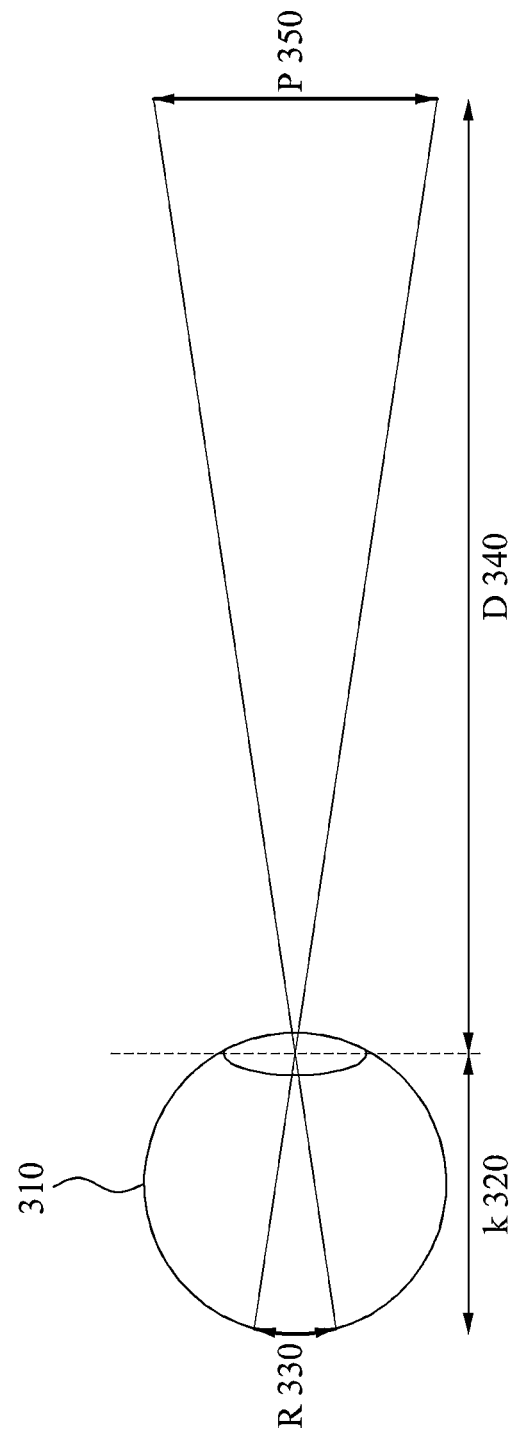
FIG. 3 illustrates a correlation of a perceived size of an object and a retinal image size of the object based on a depth of the object.

FIG. 3 illustrates a correlation of a perceived size of an object and a retinal image size of the object based on a depth of the object.

Referring to FIG. 3, a human eye 310, an eye size (k) 320, a retinal image size (R) 330 of an object, a depth (D) of an object 340, and a perceived size (P) 350 of an object may be included. As used herein, the perceived size (P) 350 of the object may be a size of an object perceived by a human rather than a physical size of the object.

A correlation between the perceived size (P) 350 of the object and the eye size (k) 320 of the object based on a depth of the object may be represented by Equation 1.

$$\frac{P}{D} = \frac{R}{k} \qquad \text{[Equation 1]}$$

During measurement of a JNDD, when the JNDD is measured by changing the depth (D) 340 of the object, the retinal image size 330 of the object may not change and thus, the perceived size (P) 350 of the object may change in proportion to a degree of change in the depth (D) 340 of the object. More particularly, the JNDD may not be measured based on the degree of change in the depth (D) 340 of the object since the perceived size (P) 350 of the object may change.

Figure 4:
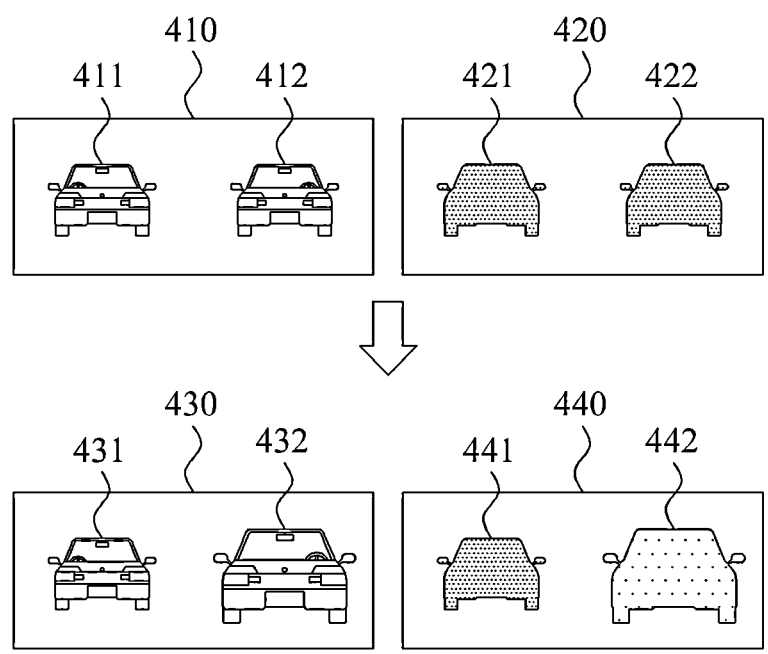
FIG. 4 illustrates a method for measuring a JNDD according to example embodiments.

FIG. 4 illustrates a method for measuring a JNDD according to example embodiments.

Referring to FIG. 4, a first image 410 displaying two identical objects 411 and 412 to a left eye and a right eye, a first depth image 420 displaying two identical objects 421 and 422 by a depth image corresponding to the first image 410, a second image 430 displaying a third object 432 which is obtained by increasing a real size of the first object 412 and an object 431 identical to the third object 432 despite having a different real size when compared to a real size of the third object 432, and a fourth image 440 displaying a fourth object 442 which is obtained by decreasing a depth of the second object 422 of the first depth image 420 and increasing a real size by a depth image corresponding to the second image 430 and an object 441 identical to the fourth object 442 despite having a different real size when compared to a real size of the fourth object 442 may be included.

A method for measuring a JNDD according to example embodiments may measure a JNDD of a 3D display for a plurality of depth testing levels by controlling a real size of an object to maintain a perceived size of the object for the plurality of depth testing levels. The controlling of the real size of the object may include controlling a retinal image size of the object. Accordingly, the controlling of the retinal image size of the object to maintain the perceived size of the object based on the change in depth of the object in Equation 1 may be replaced by controlling of the real size of the object to maintain the perceived size of the object based on the change in depth of the object The real size of the object may be controlled by being adjusted to be inversely proportional to the depth of the object.

For example, when a depth of the second object 422 among the two identical objects 421 and 422 in the first depth image 420 corresponding to the two identical objects 411 and 412 displayed on the first image 410 decreases, a real size of the fourth object 442 among the two identical objects 441 and 442 in the second depth image 440 may increase. Also, a real size of the third object 432 among the two identical objects 431 and 432 displayed on the second image 430 may increase correspondingly.

By applying such a scheme, the perceived size of the first object 412, the second object 422, the third object 432, and the fourth object 442 may be maintained to be consistent.

When a depth of the fourth object 442 among the two identical objects 441 and 442 in the second depth image 440 corresponding to the two identical objects 431 and 432 displayed on the second image 430 increases, a real size of the second object 422 among the two identical objects 421 and 422 may decrease. Since a real size of the first object 412 among the two identical objects 411 and 412 displayed on the first image 410 may decrease correspondingly, the perceived size of the first object 412, the second object 422, the third object 432, and the fourth object 442 may be controlled to be consistent based on Equation 1.

Accordingly, a JNDD may be measured while maintaining a perceived size to be consistent for a plurality of depth testing levels by increasing or decreasing a real size of an object.

In measuring the JNDD, an initial real size of an object may be adjusted, and a dependency of the JNDD on the initial real size of the object may be measured. More particularly, the dependency of the JNDD for a plurality of initial real sizes of the object may be measured by adjusting the initial real size of the object.

A method for generating a JNDD model according to example embodiments may generate a JNDD model of a 3D display based on the measurement result of the JNDD by applying such a measurement scheme.

Also, in generating the JNDD model, the JNDD model may be generated based on a viewing distance between a viewer and a 3D display. Hereinafter, the generating of the JNDD model will be described in detail.

Figure 5:
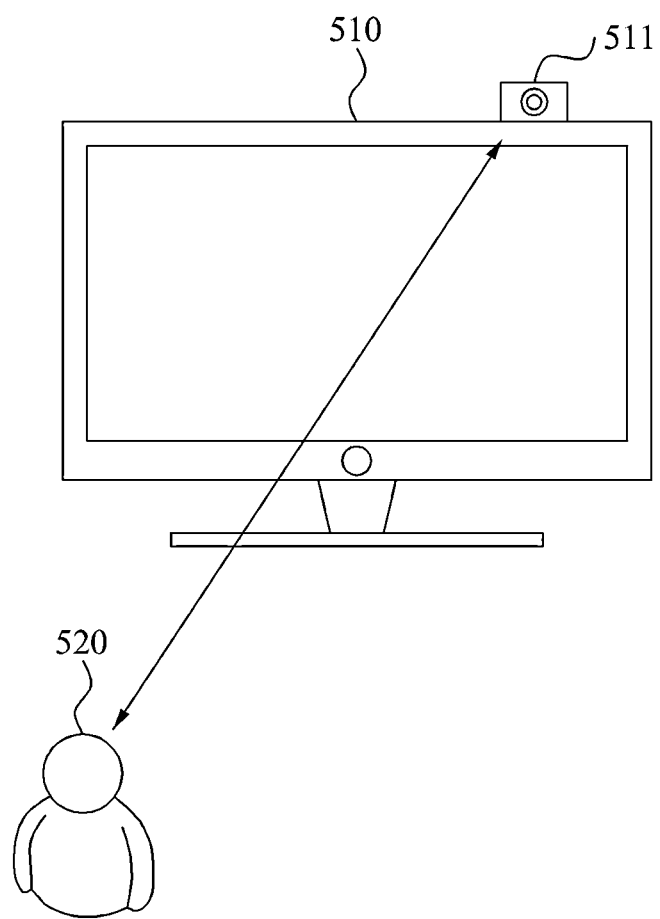
FIG. 5 illustrates a measurement of a viewing distance between a 3D display and a viewer according to example embodiments.

FIG. 5 illustrates a measurement of a viewing distance between a 3D display and a viewer according to example embodiments.

Referring to FIG. 5, the 3D display 510, a camera 511 installed in the 3D display 510, and the viewer 520 may be included.

The method for generating the JNDD may utilize the viewing distance between the viewer 520 and the 3D display 510.

Accordingly, the viewing distance between the viewer 520 and the 3D display 510 may be measured by the camera 511 installed in the 3D display 510 to measure the JNDD with respect to a plurality of viewing distances, and the JNDD may be measured from the plurality of viewing distances based on the measured viewing distance. A JNDD model for the plurality of viewing distances may be generated based on the JNDD measured from the plurality of viewing distances.

Figure 6:
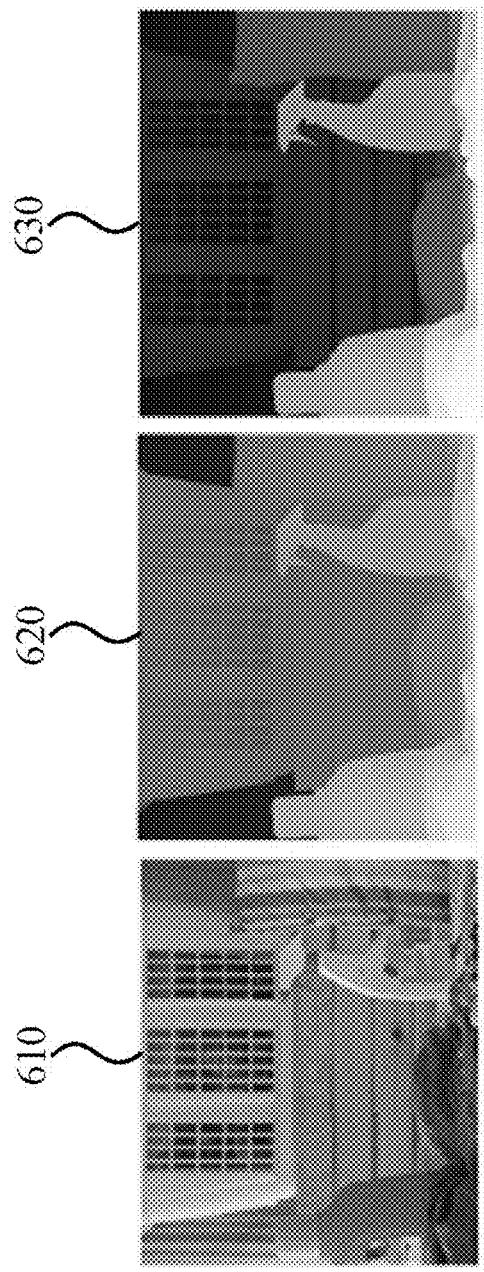
FIG. 6 illustrates an input color image and a depth image corresponding to the input color image.

FIG. 6 illustrates an input color image and a depth image corresponding to the input color image.

Referring to FIG. 6, an input color image 610, a depth image 620 corresponding to the input color image 610, and an enhanced depth image 630 may be included.

In general, enhancing a depth image of a 3D display may apply a depth image enhancing algorithm to the depth image 620 corresponding to the input color image 610 and thus, obtain the enhanced depth image 630. In this instance, a real size of an object may not change.

A method for enhancing a depth image according to example embodiments may enhance a depth image by obtaining the depth image, accessing a JNDD model pre-stored with respect to the obtained depth image, processing the depth image to maintain a perceived size of an object included in the depth image using the JNDD model accessed. The pre-stored JNDD model may be a JNDD model generated by measuring a JNDD while maintaining the perceived size of the object for a plurality of depth testing levels.

For example, the depth image may be processed to access the JNDD model stored through the method for generating the JNDD model, and to maintain the perceived size for a plurality of objects or layers using the JNDD model accessed.

In this instance, a real size of the object may be controlled to maintain the perceived size of the object for the plurality of depth testing levels, in processing the depth image to maintain the perceived size of the object. More particularly, the real size of the object may be adjusted to be inversely proportional to a depth of the object for the plurality of depth testing levels.

For example, when the depth of the object for the plurality of depth testing levels increases based on the JNDD model accessed, the perceived size of the object may be maintained consistently by decreasing the real size of the object.

Also, when the depth of the object for the plurality of depth testing levels decreases based on the JNDD model accessed, the perceived size of the object may be maintained consistently by increasing the real size of the object.

The examples above will be described in detail with reference to FIGS. 7 and 8, respectively.

Figure 7:
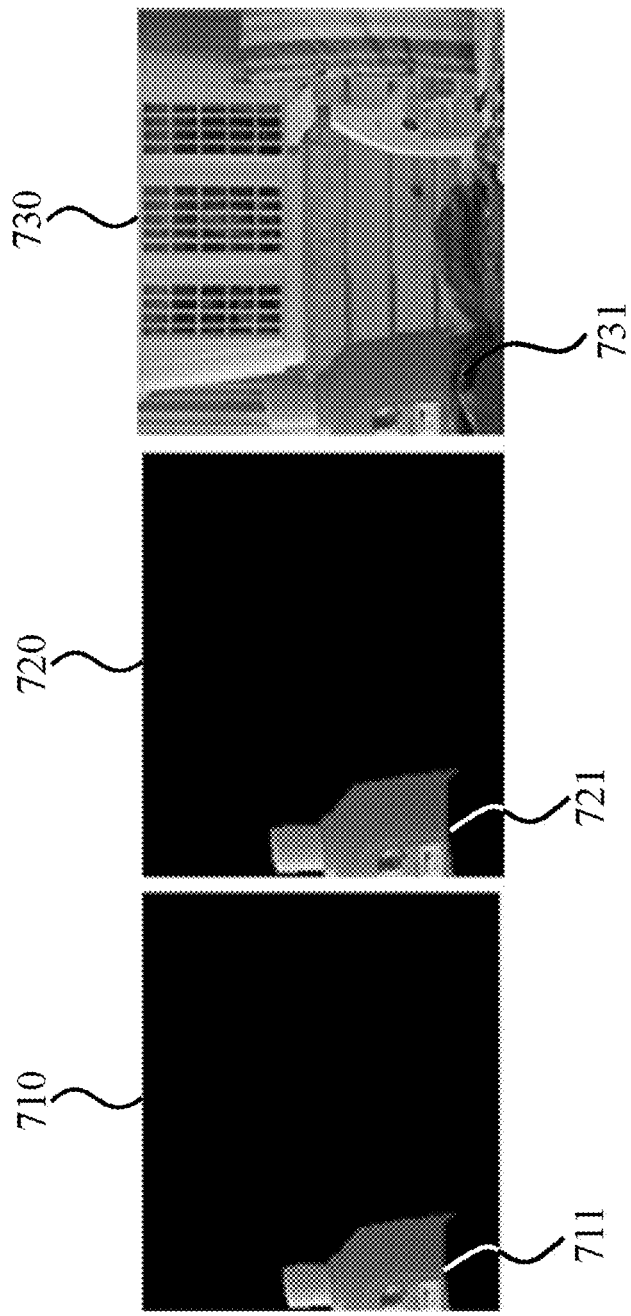
FIG. 7 illustrates an image when a depth of an object decreases according to example embodiments.

FIG. 7 illustrates an image when a depth of an object decreases according to example embodiments.

Referring to FIG. 7, an input image 710, a processed image 720, and an output image 730 may be included.

A method for enhancing a depth image according to example embodiments may process a depth image to maintain a perceived size of a first object 711 using a JNDD model of the input image 710.

The processed image 720 including a second object 721 of which a real size increases, through the controlling of which a real size of the first object 711 increases while maintaining the perceived size of the first object 711 as the depth of the object decreases may be obtained from the input image 710.

The output image 730 including a third object 731 may be obtained by applying at least one of a blending technique and a matting technique, such that the second object 721 may be matched to a surrounding area in obtaining the output image 730 from the processed image 720.

Figure 8:
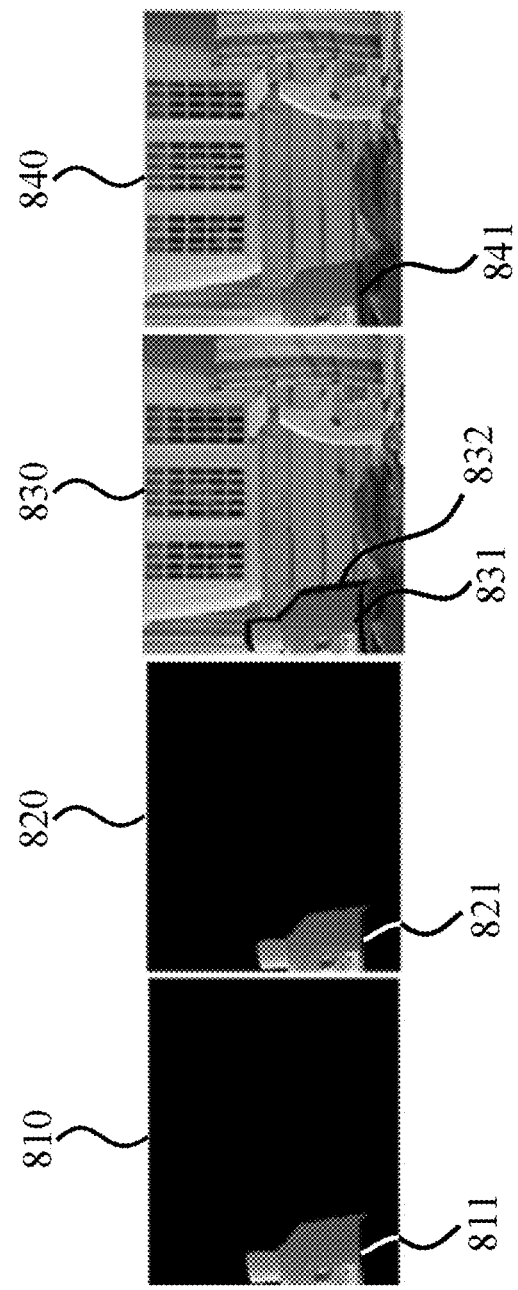
FIG. 8 illustrates an image when a depth of an object increases according to example embodiments.

FIG. 8 illustrates an image when a depth of an object increases according to example embodiments.

Referring to FIG. 8, an input image 810, a processed first image 820, a processed second image 830, and an output image 830 may be included.

A method for enhancing a depth image according to example embodiments may process a depth image to maintain a perceived size of a first object 811 using a JNDD model of the input image 810.

The processed first image 820 including a second object 821 of which a real size decreases, through the controlling of which a real size of a first object decreases while maintaining a perceived size of the first object 811 as the depth of the object increases may be obtained from the input image 810.

The processed second image 830 obtained by combining a surrounding area image and the processed first image 820 may be obtained. The processed second image 830 may include a third object 831 of which a real size decreases and a hole 832 between the third object 831 and a surrounding area.

Accordingly, the output image 840 including a fourth object 841 may be obtained by applying a technique of filling a hole area between the third object 721 and the surrounding area in the obtaining of the output image 840 from the processed second image 830.

The method for enhancing the depth image may access a JNDD model based on a viewing distance between a 3D display and a viewer while accessing a JNDD model pre-stored with respect to the obtained depth image.

Accordingly, a JNDD model for a plurality of viewing distances may be generated based on the JNDD measured from the plurality of viewing distances in the generating of the JNDD model.

For example, the method for enhancing the depth image may include measuring the viewing distance between the 3D display and the viewer, adaptively selecting the JNDD model from among a plurality of pre-stored JNDD models corresponding to the measured viewing distance, and accessing the selected JNDD model.

A 3D image may be generated using a depth image processed as described above and an input color image. In this instance, the 3D image may include a multi-view image.

Figure 9:
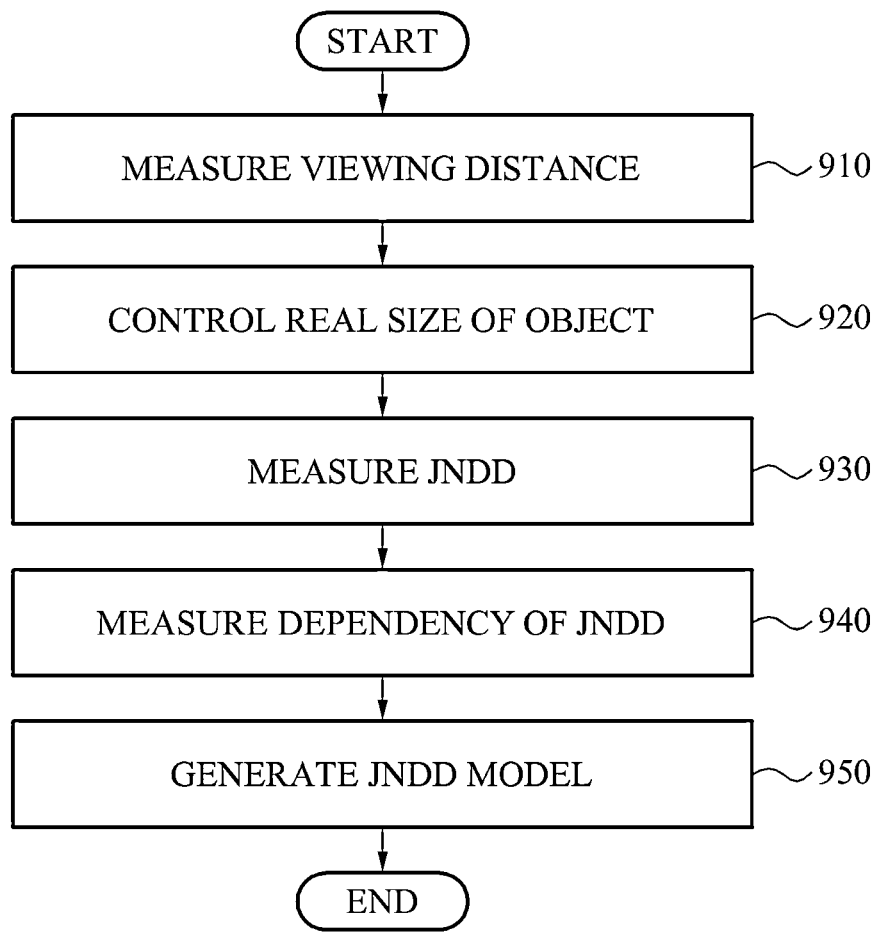
FIG. 9 illustrates a method for generating a JNDD model according to example embodiments.

FIG. 9 illustrates a method for generating a JNDD model according to example embodiments.

Referring to FIG. 9, in operation 910, the method for generating the JNDD model may measure a plurality of viewing distances between a 3D display and a viewer.

In operation 920, a real size of an object may be controlled to maintain a perceived size of the object for a plurality of depth testing levels at the plurality of viewing distances measured. Controlling of the real size of an object will be described in detail with reference to FIG. 10.

In operation 930, a JNDD of the 3D display may be measured for the plurality of depth testing levels by increasing or decreasing the real size of the object.

In operation 940, an initial real size of the object may be adjusted and a dependency of the JNDD on the initial real size of the object, for a plurality of initial real sizes with respect to the object may be measured.

In operation 950, the JNDD model of the 3D display may be generated based on the measurement result.

Figure 10:
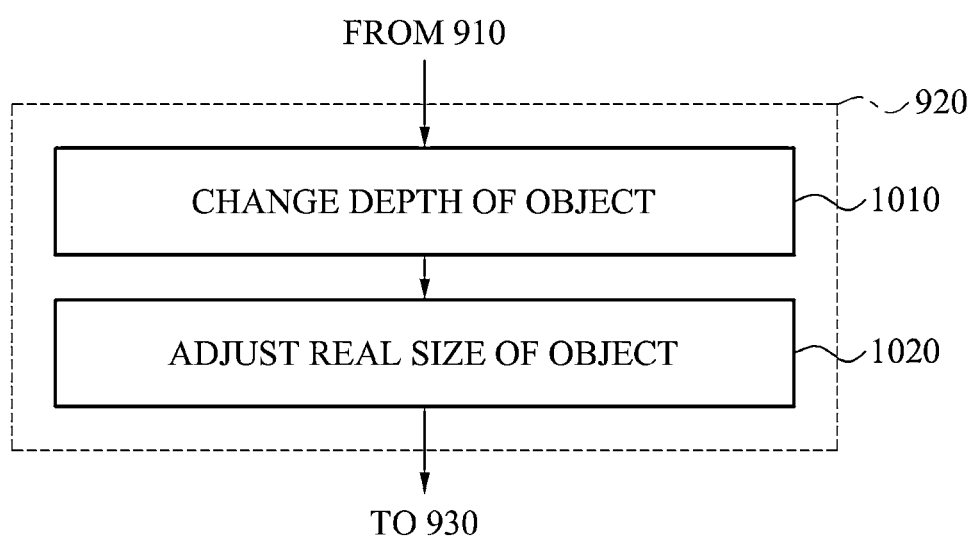
FIG. 10 illustrates operation 920 of FIG. 9 in which a real size of the object is controlled.

FIG. 10 illustrates operation 920 of FIG. 9 in which a real size of the object is controlled.

Referring to FIG. 10, in operation 1010, a depth of an object may be changed.

In operation 1020, a real size of the object may be adjusted to be inversely proportional to the depth of the object for a plurality of depth testing levels. The adjusting of the real size of the object may include changing a retinal image size of the object.

When the depth of the object increases, the real size of the object may decrease to maintain a perceived size of the object consistently, and when the depth of the object decreases, the real size of the object may increase to maintain the perceived size of the object consistently.

Figure 11:
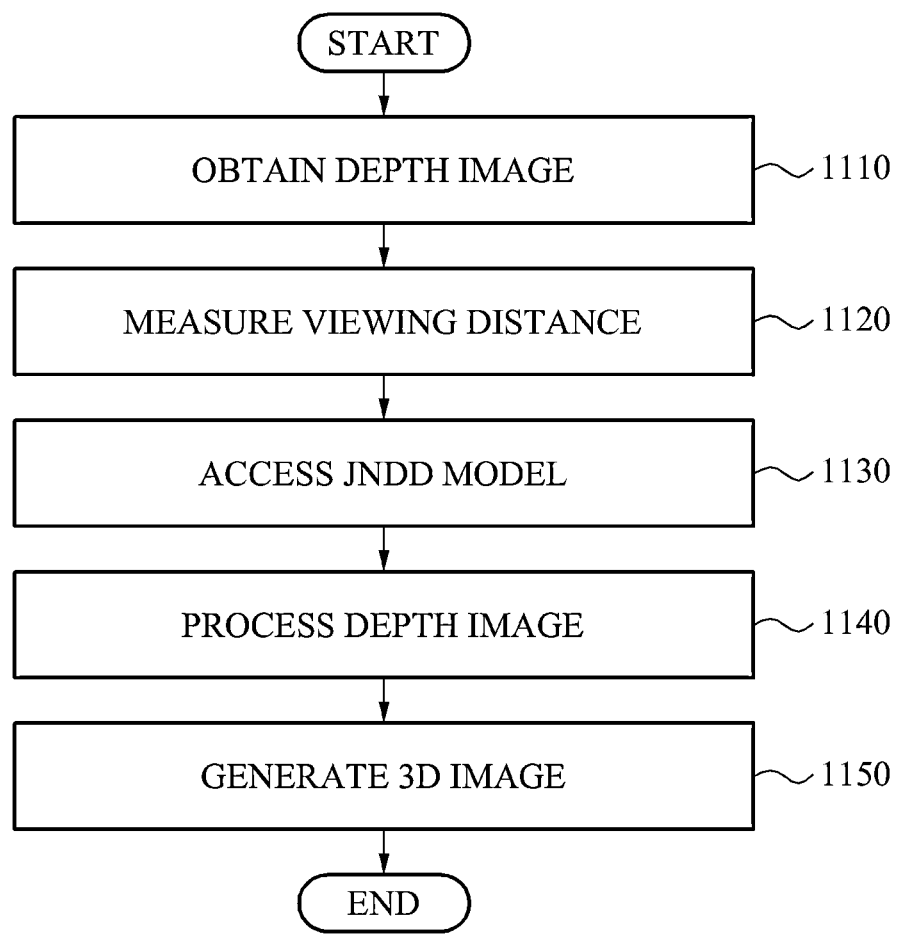
FIG. 11 illustrates a method for enhancing a depth image according to example embodiments.

FIG. 11 illustrates a method for enhancing a depth image according to example embodiments.

Referring to FIG. 11, in operation 1110, the method for enhancing the depth image may obtain a depth image.

In operation 1120, a viewing distance between a 3D display and a viewer may be measured.

In operation 1130, a JNDD model corresponding to the measured viewing distance may be selected from among a plurality of pre-stored JNDD models and accessed.

In operation 1140, the depth image may be processed to maintain a perceived size of an object included in the depth image using the accessed JNDD model. Processing of the depth image will be described in detail with reference to FIG. 12.

In operation 1150, a 3D image may be generated using the processed depth image and an input color image.

Figure 12:
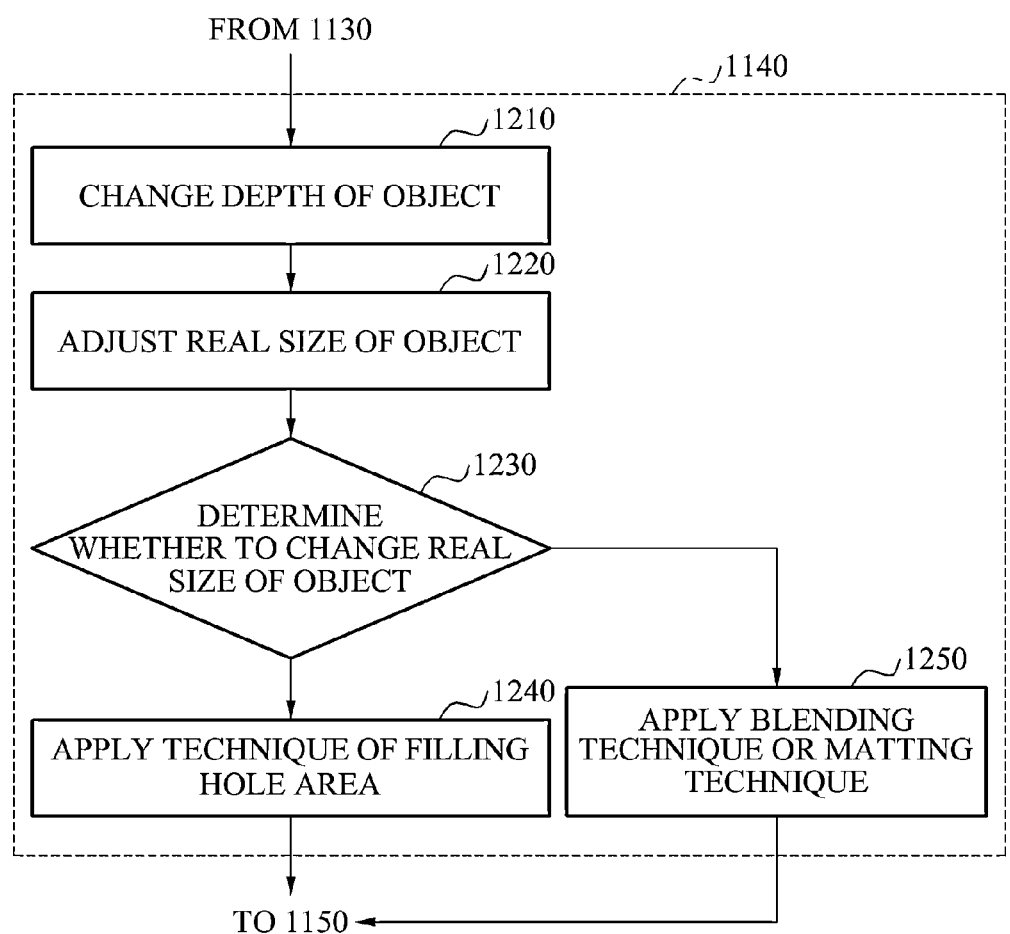
FIG. 12 illustrates operation 1140 of FIG. 11 in which the depth image is processed.

FIG. 12 illustrates operation 1140 of FIG. 11 in which the depth image is processed.

Referring to FIG. 12, in operation 1210, a depth of an object may be changed according to example embodiments.

In operation 1220, a real size of the object may be adjusted to be inversely proportional to the depth of the object for a plurality of depth testing levels. The adjusting of the real size of the object may include changing a retinal image size of the object.

When the depth of the object increases, the real size of the object may decrease to maintain a perceived size of the object, and when the depth of the object decreases, the real size of the object may increase to maintain the perceived size of the object.

In operation 1230, whether to change the real size of the object may be determined.

In operation 1240, when the real size of the object decreases, a technique of filling a hole area between the object and a surrounding area may be applied.

In operation 1250, when the real size of the object increases, at least one of a blending technique and a matting technique may be applied to match the object to the surrounding area.

Figure 13:
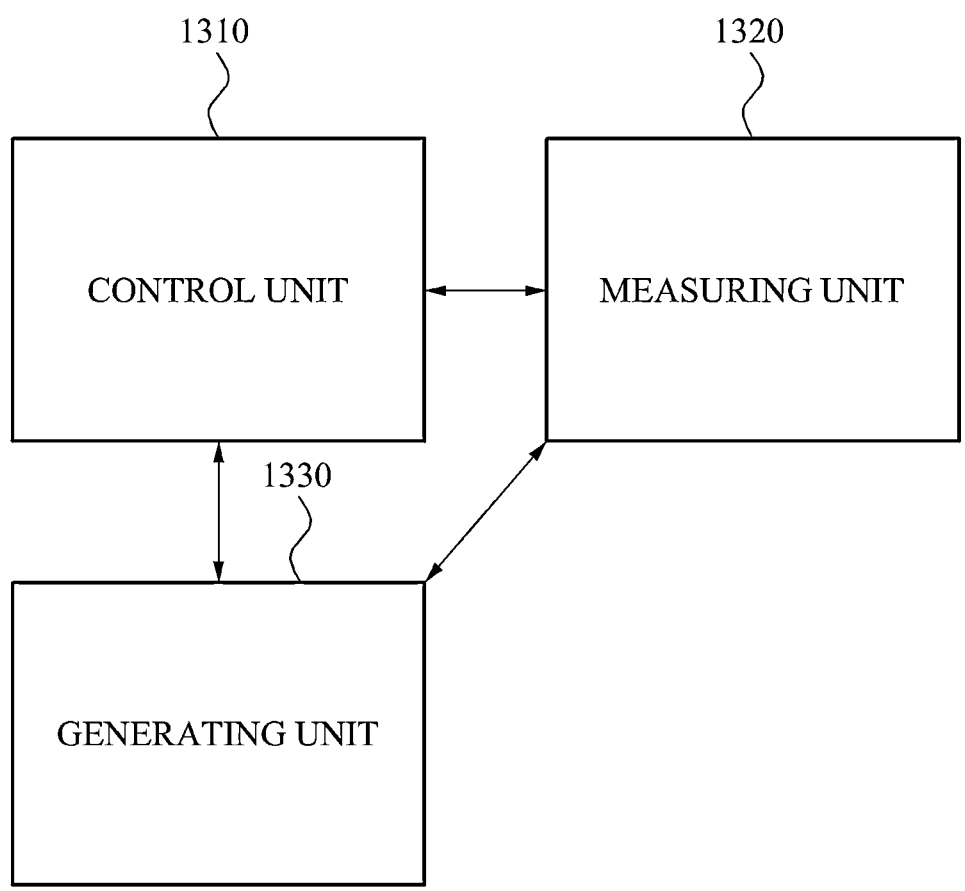
FIG. 13 illustrates a system for generating a JNDD model according to example embodiments.

FIG. 13 illustrates a system for generating a JNDD model according to example embodiments.

Referring to FIG. 13, a control unit 1310, a measuring unit 1320, and a generating unit 1330 may be included.

The control unit 1310 may control a real size of an object to maintain a perceived size of the object for a plurality of depth testing levels.

The control unit 1310 may adjust the real size of the object to be inversely proportional to a depth of the object for the plurality of depth testing levels.

For example, when the depth of the object increases, the control unit 1310 may decrease the real size of the object, and when the depth of the object decreases, the control unit 1310 may increase the real size of the object.

The measuring unit 1320 may measure a JNDD of a 3D display for a plurality of depth testing levels by increasing or decreasing the real size of the object.

The measuring unit 1320 may adjust an initial real size of the object, and measure a dependency of the JNDD on the initial real size of the object.

The measuring unit 1320 may measure a viewing distance between the 3D display and a viewer, and measure the JNDD from a plurality of viewing distances.

The generating unit 1330 may generate a JNDD model of the 3D display based on the measurement result.

Figure 14:
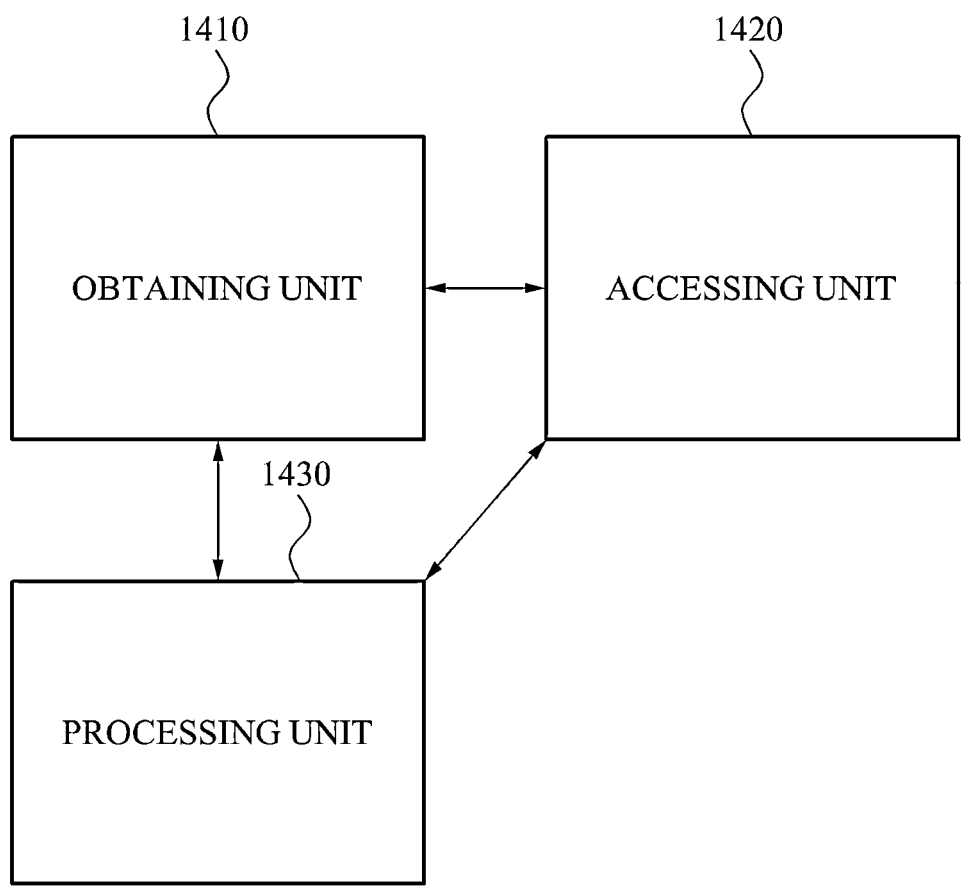
FIG. 14 illustrates a system for enhancing a depth image according to example embodiments.

FIG. 14 illustrates a system for enhancing a depth image according to example embodiments.

Referring to FIG. 14, an obtaining unit 1410, an accessing unit 1420, and a processing unit 1430 may be included.

The obtaining 1410 may obtain a depth image.

The accessing unit 1420 may access a JNDD model pre-stored, in which a perceived size of an object may be maintained for a plurality of depth testing levels.

The accessing unit 1420 may measure a viewing distance between a 3D display and a viewer, and access the JNDD model corresponding to the viewing distance.

The processing unit 1430 may process the depth image to maintain the perceived size of the object included in the depth image using the JNDD model accessed.

The processing unit 1430 may control a real size of the object to maintain the perceived size of the object for the plurality of depth testing levels.

The processing unit 1430 may adjust the real size of the object to be inversely proportional to a depth of the object for the plurality of depth testing levels.

When the depth of the object increases for the plurality of depth testing levels, the processing unit 1430 may decrease the real size of the object, and may apply a technique of filling a hole area between the object and a surrounding area. When the depth of the object decreases for the plurality of depth testing levels, the real size of the object may increase, and at least one of a blending technique and a matting technique may be applied to match the object to the surrounding area.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

A method for generating a JNDD model of a 3D display and for enhancing a depth image using the JNDD model according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for generating a just noticeable depth difference (JNDD) model of a three-dimensional (3D) display, the method comprising:
controlling a real size of an object to maintain a perceived size of the object for a plurality of depth testing levels, wherein the controlling of the real size of the object comprises adjusting the real size of the object so as to be inversely proportional to a depth of the object for the plurality of depth testing levels;
measuring a JNDD of the 3D display for the plurality of depth testing levels by increasing or decreasing the real size of the object; and
generating a JNDD model of the 3D display based on the measurement result.

2. The method of claim 1, wherein the measuring of the JNDD further comprises:
adjusting an initial real size of the object; and
measuring a dependency of the JNDD on the initial real size of the object.

3. The method of claim 1, further comprising: measuring a plurality of viewing distances between the 3D display and a viewer, wherein the measuring of the JNDD comprises:
measuring the JNDD with respect to the plurality of viewing distances.

4. The method of claim 1, wherein the adjusting of the real size of the object comprises:
decreasing the real size of the object when the depth of the object increases.

5. The method of claim 1, wherein the adjusting of the real size of the object comprises:
increasing the real size of the object when the depth of the object decreases.

6. A method for enhancing a depth image of a three-dimensional (3D) display, the method comprising:

obtaining a depth image;

accessing a pre-stored just noticeable depth difference (JNDD) model, in which a perceived size of an object is controlled to be maintained for a plurality of depth testing levels; and processing the depth image to maintain a perceived size of an object included in the depth image, using the JNDD model, wherein the processing of the depth image comprises controlling a real size of the object to maintain the perceived size of the object for the plurality of depth testing levels, and wherein the controlling of the real size of the object comprises adjusting the real size of the object to be inversely proportional to a depth of the object for the plurality of depth testing levels.

7. The method of claim 6, further comprising: measuring a viewing distance between the 3D display and a viewer, wherein the accessing of the pre-stored JNDD model comprises:

accessing the JNDD model corresponding to the viewing distance.

8. The method of claim 6, further comprising:

generating a 3D image using the depth image processed and a color image input.

9. The method of claim 6, wherein the adjusting of the real size of the object comprises:

decreasing the real size of the object when the depth of the object for the plurality of depth testing levels increases.

10. The method of claim 9, further comprising: applying a technique of filling a hole area between the object and a surrounding area.

11. The method of claim 6, wherein the adjusting of the real size of the object comprises:

increasing the real size of the object when the depth of the object for the plurality of depth testing levels decreases.

12. The method of claim 11, further comprising:

applying at least one of a blending technique or a matting technique to match the object to the surrounding area.

13. A system for generating a just noticeable depth difference (JNDD) model of a three-dimensional (3D) display, the system comprising:

a control unit configured to control a real size of an object to maintain a perceived size of the object for a plurality of depth testing levels by adjusting the real size of the object so as to be inversely proportional to a depth of the object for the plurality of depth testing levels;

a measuring unit configured to measure a JNDD with respect to the 3D display for the plurality of depth testing levels by increasing or decreasing the real size of the object; and a generating unit configured to generate a JNDD model with respect to the 3D display based on the measurement result.

14. A system for enhancing a depth image of a three-dimensional (3D) display, the system comprising:

an obtaining unit configured to obtain a depth image;

an accessing unit configured to access a pre-stored just noticeable depth difference depth (JNDD) model, in which a perceived size of an object is maintained for a plurality of depth testing levels; and a processing unit configured to process the depth image to maintain a perceived size of an object included in the depth image, using the JNDD model, wherein the processing unit is configured to control a real size of the object to maintain the perceived size of the object for the plurality of depth testing levels by adjusting the real size of the object to be inversely proportional to a depth of the object for the plurality of depth testing levels.

* * * * *